US010313861B2

(12) United States Patent
Kwan et al.

(10) Patent No.: US 10,313,861 B2
(45) Date of Patent: Jun. 4, 2019

(54) WIRELESS CONTROL OF MULTIPLE ACTOR DEVICES BY MULTIPLE CONTROLLER DEVICES WITH COMMUNICATION SECURITY

(71) Applicant: WiSilica Inc., Laguna Hills, CA (US)

(72) Inventors: Dennis Kwan, San Diego, CA (US); Suresh Kumar Singamsetty, Aliso Veijo, CA (US)

(73) Assignee: WiSilica Inc., Laguna Hills, CA (US)

( * ) Notice: Subject to any disclaimer, the term of this patent is extended or adjusted under 35 U.S.C. 154(b) by 0 days.

(21) Appl. No.: 15/702,790

(22) Filed: Sep. 13, 2017

(65) Prior Publication Data

US 2018/0077520 A1 Mar. 15, 2018

Related U.S. Application Data

(60) Provisional application No. 62/394,800, filed on Sep. 15, 2016.

(51) Int. Cl.

| | |
|---|---|
| *H04W 4/80* | (2018.01) |
| *H04L 29/06* | (2006.01) |
| *H04L 29/08* | (2006.01) |
| *H04L 12/24* | (2006.01) |
| *H04W 12/02* | (2009.01) |
| *H04W 4/70* | (2018.01) |

(52) U.S. Cl.
CPC ........... *H04W 4/80* (2018.02); *H04L 63/0428* (2013.01); *H04L 67/125* (2013.01); *H04L 41/12* (2013.01); *H04L 67/12* (2013.01); *H04W 4/70* (2018.02); *H04W 12/02* (2013.01)

(58) Field of Classification Search
CPC ........................................................ H04W 4/80
USPC ..................................... 455/41.1, 41.2, 41.3
See application file for complete search history.

(56) References Cited

U.S. PATENT DOCUMENTS

| | | | |
|---|---|---|---|
| 2014/0378057 A1* | 12/2014 | Ramon ..................... | H04L 9/32 455/41.2 |
| 2015/0124571 A1* | 5/2015 | Hirabayashi ............. | H04Q 9/00 368/155 |
| 2015/0256968 A1* | 9/2015 | Terazaki .................. | H04W 76/10 455/41.2 |
| 2015/0350810 A1* | 12/2015 | Cairns ................. | H04L 47/6225 455/41.2 |
| 2015/0351145 A1* | 12/2015 | Burks .................... | G08C 17/02 455/41.3 |

(Continued)

*Primary Examiner* — Wen W Huang
(74) *Attorney, Agent, or Firm* — Rowan TELS LLC (57) ABSTRACT

Communication may be enabled between mobile devices (i.e., controllers) and Internet of Things (IoT) devices by sending connectionless commands from a controller to an IoT device, or sending connectionless commands from a controller to more than one IoT devices, at the same time. One or more commands may be sent from a controller to one or more nodes that form a network, with the nodes relaying messages to each other via connectionless data packets. This may allow for connectionless command relay from the controller to any node within the network. By sending commands through connectionless data packets, one or more controllers may control one or more nodes at the same time. Furthermore, a single controller may directly send one or more commands to a group of nodes at the same time.

9 Claims, 8 Drawing Sheets

(56) References Cited

U.S. PATENT DOCUMENTS

| | | | |
|---|---|---|---|
| 2015/0358759 A1* | 12/2015 | Jakusovszky | H04W 4/008 455/41.2 |
| 2016/0088424 A1* | 3/2016 | Polo | H04W 4/80 455/41.1 |
| 2016/0100311 A1* | 4/2016 | Kumar | H04L 63/123 726/7 |
| 2016/0174346 A1* | 6/2016 | Koriyama | H05B 37/0272 315/130 |
| 2016/0191642 A1* | 6/2016 | Acar | H04L 67/2814 455/41.2 |
| 2016/0205496 A1* | 7/2016 | Su | H04W 4/008 455/41.1 |
| 2016/0255704 A1* | 9/2016 | Mueller | H04W 80/02 315/307 |
| 2017/0251469 A1* | 8/2017 | Lee | H04W 72/0446 |
| 2017/0265046 A1* | 9/2017 | Chen | H04W 4/08 |
| 2018/0092041 A1* | 3/2018 | Choi | H04L 1/1657 |

* cited by examiner

WIRELESS CONTROL OF MULTIPLE ACTOR DEVICES BY MULTIPLE CONTROLLER DEVICES WITH COMMUNICATION SECURITY

CROSS-REFERENCE TO RELATED APPLICATION

This application claims the benefit of U.S. Provisional Patent Application No. 62/394,800 filed Sep. 15, 2016. The subject matter of this earlier filed application is hereby incorporated by reference in its entirety.

FIELD

The present invention generally relates to wireless data communication, and more specifically, to secure and real-time wireless data communication from one or more controller devices to one or more actor devices.

BACKGROUND

The Bluetooth™ Enabled (BLE) protocol is one of the most popular communication technologies used in the Internet of Things (IoT) due to the explosive growth in the use of mobile devices (also denoted "controller devices" or "controllers" herein), most of which have BLE capabilities built-in. The growth in IoT devices (also denoted "actor devices" or "actors" herein) using BLE has largely been due to the available ecosystem and the relatively low cost of chipset technology. Today, most BLE-based IoT devices can be operated from a mobile device, such as a smart phone or tablet computing system. These mobile devices, in general, function as a BLE master or central device, with the IoT devices functioning as BLE slave or peripheral devices. This system implementation requires the mobile device to execute a BLE air interface protocol with the IoT device in order to establish a connection prior to sending one or more commands.

This requirement, however, becomes a problem when multiple mobile devices attempt to control the same IoT device. For example, the mobile device that makes the first connection with the IoT device will have control, and all other mobile devices have to wait until the first mobile device disconnects from the IoT device before they can connect to and control the IoT device. Most IoT devices are relatively low-cost and low-power devices, and do not support multiple connections from multiple BLE master devices simultaneously. Because of this, the IoT device will be blocked by the first mobile device that makes a connection with the IoT device. Unless that mobile device manually or automatically disconnects from the IoT device, no other mobile devices can control the IoT device.

Alternatively, the mobile device may only setup a connection with the IoT device every time it needs to send a command, after which the mobile device may disconnect, allowing other mobile devices to control the IoT device. In this case, the latency becomes unacceptable for most IoT devices as the connection setup time for BLE is typically in the order of a few seconds. For example, the delay of a few seconds in a light bulb being turned on by a smart phone would negatively impact the user's experience.

Also, as IoT applications become more widely adopted in the market, the typical home or office environments may have tens or hundreds of BLE devices. Most smart phones can maintain fewer than ten BLE connections simultaneously due to hardware or software limitations, and/or power consumption reasons. Maintaining constant connections with all IoT devices becomes impossible for such mobile devices and the connection setup latency would seriously impact user experience.

Therefore, it is not practical to use a connection-oriented scheme for IoT devices. Thus, an alternative technique to resolve these issues using a connectionless implementation, and additionally introducing data security methods to provide a high level of wireless network security that would otherwise be relatively easily compromised using BLE protocol alone, may be beneficial.

SUMMARY

Certain embodiments of the present invention may provide solutions to the problems and needs in the art that have not yet been fully identified, appreciated, or solved by conventional communication technologies. For example, some embodiments pertain to enabling communication between a mobile device (i.e., controllers) and IoT devices by sending a connectionless command from a single controller to an IoT device or sending a connectionless command to more than one IoT device, at the same time.

Some embodiments generally pertain to secure and real-time wireless data communication from one or more controller devices to one or more actor devices, such that messages from the one or more controller devices may result in actions in the one or more actors. Furthermore, the secure and real-time wireless data communication may allow one or more controller devices to control one or more actor devices, all with minimal delays and with a high level of data security. More specifically, the one or more controller devices in some embodiments may be mobile phones or sensor devices implementing BLE in slave (or peripheral) mode, and the one or more actor device may be BLE devices operating in master (or central) mode. The one or more controller devices may use BLE advertising packets for sending messages to the one or more actor devices without the need to set up any logical connections between the one or more controller devices and the one or more actor devices prior to messages being transmitted.

In an embodiment, a system includes a controller and a network including a plurality of nodes. The controller is configured to send a connectionless command message to a recipient node of the plurality of nodes, wait for an acknowledgement or status message from the recipient node, and receive the acknowledgement or status message from the recipient node. The recipient node is configured to receive the connectionless command message, complete a task associated with a command of the connectionless command message or retrieve a status of the recipient node, and send the acknowledgement or status message to the controller after the task is completed or the status is retrieved. The connectionless command message does not interfere with other connectionless command messages to the recipient node from other controllers.

In another embodiment, a controller includes memory storing computer program code for connectionless communication and at least one processor configured to execute the computer program code. The controller is configured to send a connectionless command message to a recipient node in a network comprising a plurality of nodes, wait for an acknowledgement or status message from the recipient node, and receive the acknowledgement or status message from the recipient node. The connectionless command message does not interfere with other connectionless command messages to the recipient node from other controllers.

In yet another embodiment, a node includes memory storing computer program code for connectionless communication and at least one processor configured to execute the computer program code. The node is configured to receive a connectionless command message from a controller, complete a task associated with a command of the connectionless command message, and send an acknowledgement or status message to the controller after the task is completed or the status is retrieved. The connectionless command message does not interfere with other connectionless command messages to the node from other controllers.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to enabling communication between mobile devices (i.e., controllers) and IoT devices by sending connectionless commands from a controller to an IoT device, or sending connectionless commands from a controller to more than one IoT devices, at the same time. A controller may include a smartphone, a cellular phone, a tablet computing system, a laptop, or any other device that may communicate using wireless communication protocols, such as BLE, to send command messages in order to control IoT devices without deviating from the scope of the invention. Also, for purposes of explanation, an IoT device is referred to herein as a "node".

In some embodiments, one or more commands may be sent from a controller to one or more nodes that form a network, with the nodes relaying messages to each other via connectionless data packets. This may allow for connectionless command relay from the controller to any node within the network. By sending commands through connectionless data packets, one or more controllers may control one or more nodes at the same time. Furthermore, a single controller may directly send one or more commands to a group of nodes at the same time.

Advantages of some embodiments include, but are not limited to: (1) Fast Response—the controller does not need to set up a connection with the node to send commands; (2) Simultaneous control of a single IoT device by multiple controllers—connectionless data packets from multiple controllers can be received by a single IoT device without being blocked by a controller that maintains a connection with the IoT device; (3) User Experience—controller users are not required to manually determine which controller user has control of the node and how to transfer control to another controller user; (4) Control—a single controller may directly send commands to more than one node at the same time; (5) Large IoT Device Population—not limited by the number of simultaneous connections supported by the controller; and/or (6) High Mobility: controllers may move in and out of radio coverage of the nodes without causing excessive processing and power consumption overhead in connection set up and disconnection. Controllers may send data packets immediately within the coverage area to be receivable by the nodes. The controllers may be in the coverage area for a relatively short time due to user movement.

Generally, when a user of a controller controls a node, the controller must first connect to the node. Thereafter, the controller may send a command through the connection. In BLE, such a configuration requires the node to frequently send a connectable BLE advertisement for the controller to maintain a connection. When there is more than one node, the controller either connects to each node or connects to a single node, and the single node then sends the command to the other nodes.

Figure 1A:
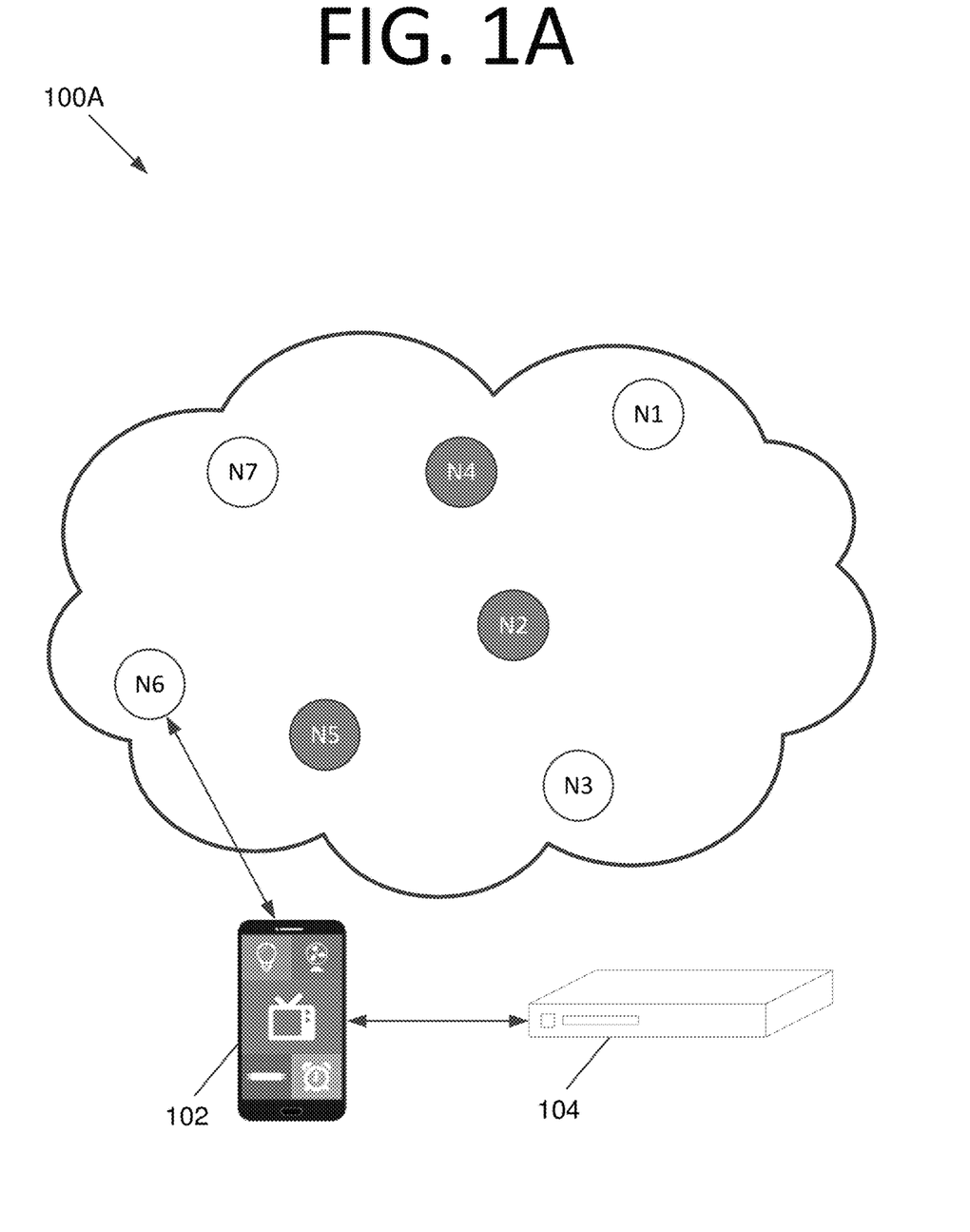
FIG. 1A is an architectural diagram illustrating a network configured to send connectionless commands, according to an embodiment of the present invention.
Figure 1B:
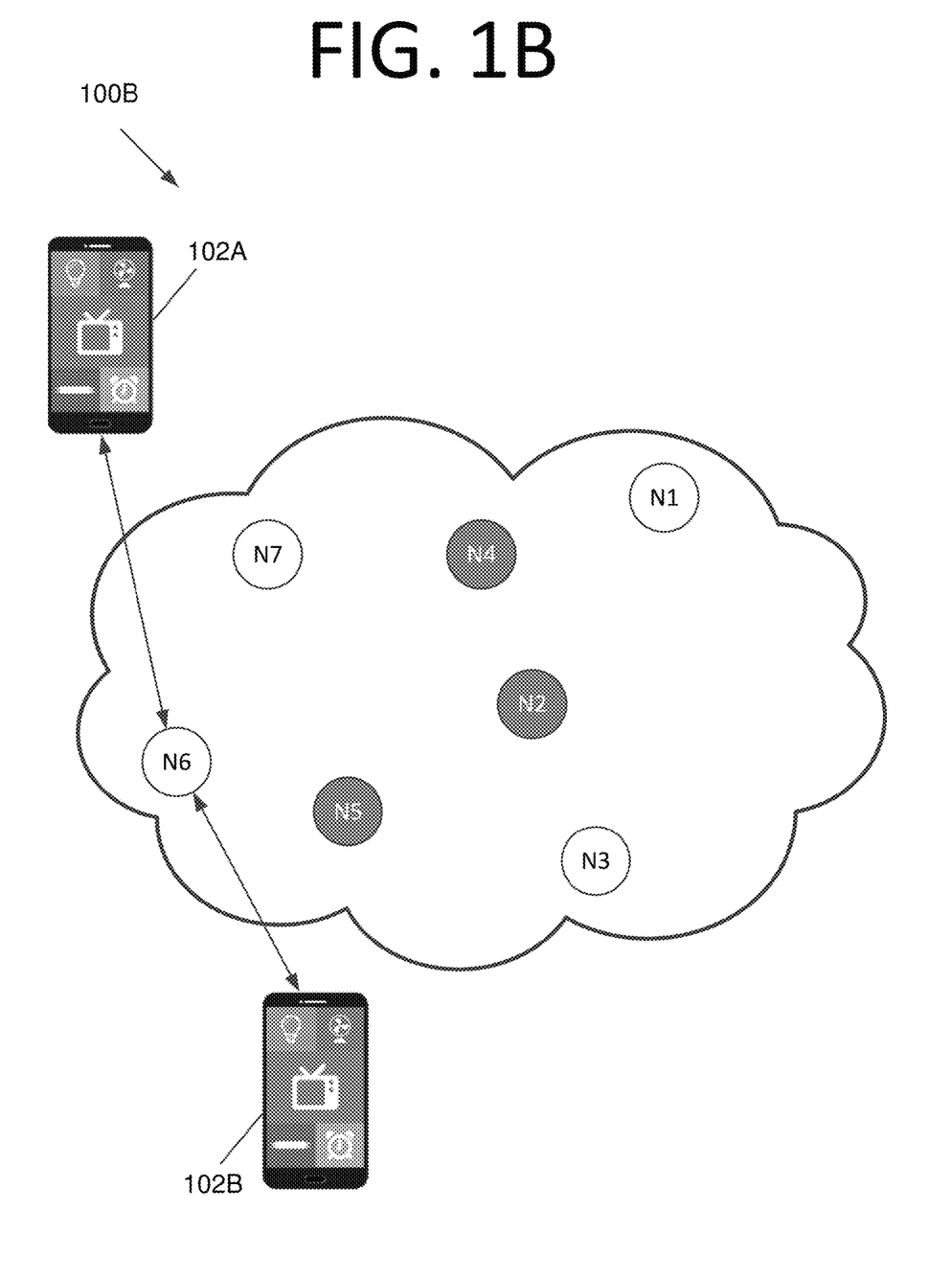
FIG. 1B is an architectural diagram illustrating a network configured to sending connectionless commands from one or more controllers, according to an embodiment of the present invention.

FIGS. 1A and 1B architectural diagrams illustrating networks 100A, 100B for sending connectionless commands, according to two embodiments of the present invention. In FIG. 1A, network 100A includes nodes N1, N2, . . . , N7. Each node may be independent of one another or may be part of a larger group of nodes.

In some embodiments, network 100A sends connectionless commands using BLE communication. For instance, in order to send a connectionless command, the BLE communication of controller 102 operates under a peripheral mode rather than the standard master or central mode. This allows nodes N1, N2, . . . , N7 to be controlled without creating the bottleneck issue discussed above.

In network 100B of FIG. 1B, one or more connectionless commands are sent from one or more controllers 102A, 102B, using BLE communication. In this embodiment, second controller 102B may send connectionless commands using BLE communication in a similar manner as controller 102A. This way, multiple controllers may control any of the nodes N1, N2, . . . , N7 at any given time.

Returning to FIG. 1A, for example, as would be appreciated by one of ordinary skill in the art, an application for sending commands (e.g., command module 545 of FIG. 5) may be stored on controller 102. In order to initiate the process of sending the commands, the user of controller 102 may launch or login to the application. Upon execution of the application, controller 102 may begin to retrieve information, such as a network identification (ID), node ID, group ID, and key(s), for nodes N1, N2, ..., N7. This information may be retrieved from a server 104 or local storage of controller 102, for example. Server 104 may be in any desired location, so long as direct or indirect communication with controller 102 is possible. For the purposes of FIGS. 1A and 1B, controller 102 retrieves information for node N6. This information may be necessary to communicate with node N6.

It should be noted that the controller may not always be in communication range of the node with which it is trying to communicate. For instance, if controller 102 is trying to control node N1 and is out of range of node N1, but in range of node N6, and node N6 is in range of Node N1, node N6 may rebroadcast the command message such that it is received by node N1. Node N6 may similarly rebroadcast the acknowledgement message from node N1, once received by node N6, such that controller 102 receives the acknowledgement message.

When a command needs to be sent from controller 102 to node N6, for example, a message is created. The message may be in the form of a packet that includes 16 bytes of encrypted data using the AES 128-bit algorithm to protect readability, repeatability, and replaceability (3R) security threats. However, any desired amount of encrypted data and encryption scheme may be used without deviating from the scope of the invention. This encrypted packet may include the network ID, destination device or group ID, source ID, command, command parameters, sequence ID, and subsequence ID. The network ID is an identifier that uniquely identifies a given network. The destination device or group ID uniquely identifies the device or group of devices to which the packet is sent. The source identifier uniquely identifies the source device (i.e., controller). In some embodiments, this information (or data) may only be decrypted either by a device key that is only known to the IoT device and a server, or by a network key that is known only to server 104 and the devices within the network.

In some embodiments, each encrypted packet is unique since the encrypted packet has both sequence and subsequence IDs. Since the encrypted packet can be decrypted only by those who have the decryption key, no unauthorized entity can read the data. This protects the communication from a Readability attack. In other words, an eavesdropper will not be able to understand the content of the message by analyzing the packet or associating a packet with an action occurred during that time.

When the packet is decrypted, a cyclical redundancy check (CRC) is performed to make sure the content has not been tampered with. Also, it is validated that the sequence ID and the subsequence ID are greater than the previous IDs received from the same source. This protects against a Repeatability attack from an eavesdropper resending the same packet again. If the sequence ID is equal to or less than what was already received by the destination device (or node), the destination device will ignore the packet. The packet may also contain the source, destination, and CRC bits of the entire packet, including a header outside the encrypted area. This protects against a Replaceability attack from a hacker by changing only a few bits and getting the updated command processed either by the same device or a different device in the network. Also, additional authorization at the destination device can be performed to authorize specific commands from specific devices.

In some embodiments, the message may include control and status information. This may allow controller 102A to control one or more nodes N1, N2, ..., N7, and receive the status of the operation. In this example, if the command is to turn on a light in a particular room and node N6 successfully turns on the light, node N6 may send a status of operation informing controller 102A that the light was successfully turned on. As shown in FIG. 1B, controller 102B may similarly login and obtain network information, and thus, be able to access and control any node N1, N2, ..., N7 in a similar manner to controller 102A.

Depending on the implementation, the message containing the command may include an identifier. For example, the identifier may be used to control any one of nodes N1, N2, ..., N7 in a hoppable mesh format, to send the status message from any one of nodes N1, N2, ..., N7 to controller 102A, 102B, for group control operations, for sensor control operations, and/or for any other suitable operation without deviating from the scope of the invention.

By using these identifiers, the message can be sent to a single node or a group of nodes. In FIG. 1A, the message can be sent from controller 102 to node N6. When the message is transmitted to a group of nodes N1, N2, ..., N7, a group ID may be used instead of a device ID.

Once controller 102 sends the message, controller 102 may switch to listening mode. When controller 102 is in listening mode, controller 102 waits for a response from nodes N1, N2, ..., N7. Nodes N1, N2, ..., N7, such as Wise™ devices, may be frequently scanning (e.g., multiple times per second) for BLE messages in order to receive a command from controller 102.

In the example described herein, when node N6 receives the message, including the command, node N6 processes the command and validates the command, ensuring that node N6 is the correct destination. When node N6 accepts the message, node N6 processes the command and advertises an acknowledgement that controller 102 can understand. Otherwise, node N6 receives the same message again, and node N6 may ignore the message.

When 102 receives the acknowledgement message from node N6, controller 102 sends a response to the appropriate subscriber. The subscriber may be an application running on the controller, server 104, or both. In noisy environments, it may be possible that either the node does not receive the command or the controller does not receive the response. For example, if controller 102 does not receive the acknowledgement message, controller 102 resends the command with a new sequence ID. This way, the message, which includes the command, is not ignored by node N6. This retry mechanism avoids many data/command loss issues. If controller 102 does not receive any response after the configured number of retries controller 102 may notify the subscriber about this issue. The embodiment shown in FIG. 1B may be executed in a similar manner as shown in FIG. 1A.

Figure 2:
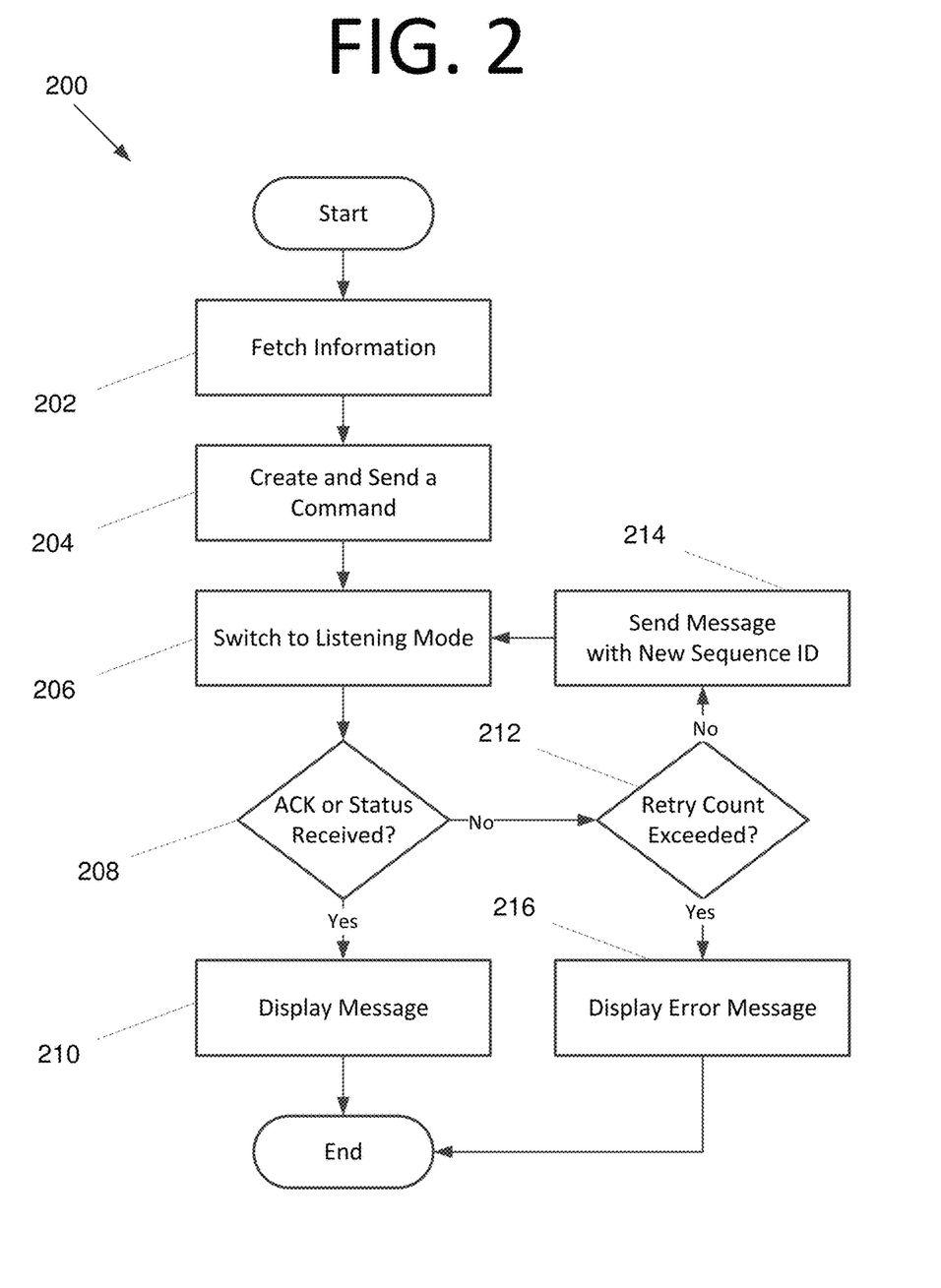
FIG. 2 is a flow diagram illustrating a process for sending connectionless commands, according to an embodiment of the present invention.

FIG. 2 is a flow diagram illustrating a process 200 for sending connectionless commands, according to an embodiment of the present invention. In some embodiments, the process begins at 202 with a controller fetching information, such as a network ID, device ID, group ID, and keys, from one or more nodes. At 204, the controller creates and sends a message when a command needs to be sent to the one or more nodes. At 206, the controller switches to listening mode, and waits for a response from the one or more nodes.

At 208, while the controller is in listening mode, the controller periodically checks whether the controller received an acknowledgement message, or in some embodiments, a status message, from the one or more nodes. In certain embodiments, the controller may check for the acknowledgement message after a predefined period of time or may wait until the acknowledgement message is received. Upon receipt of the acknowledgement message, or in some embodiments, after confirming that the acknowledgement message has been received, the controller at 210 creates a message to display to the user of the controller informing the user that the acknowledgement message has been received. Otherwise, if an acknowledgement message is not received within a predefined period of time, the controller determines at 212 whether a retry count has exceeded a max retry value (e.g., three retries, ten retries, etc.). If the retry count has not exceeded the max retry value, then the controller at 214 sends the message including the command again with a new sequence ID to the one or more nodes. The process then returns to 208, which is checking or waiting for the acknowledgement message while in listening mode.

In some embodiments, when the process continuously returns to 208, the controller may include a max retry counter. This max retry counter may increase the retry count every time a retry message is sent to the one or more nodes. If the retry counter exceeds the max retry value, which may be predefined, then the process will terminate in some embodiments. For example, if the controller determines at 212 that the retry count has exceeded the max retry value, then the controller at 216 displays the error message indicating that the retry count has exceeded the max retry value. In embodiments that include more than one controller, a similar process as shown in FIG. 2 may be executed.

Figure 3:
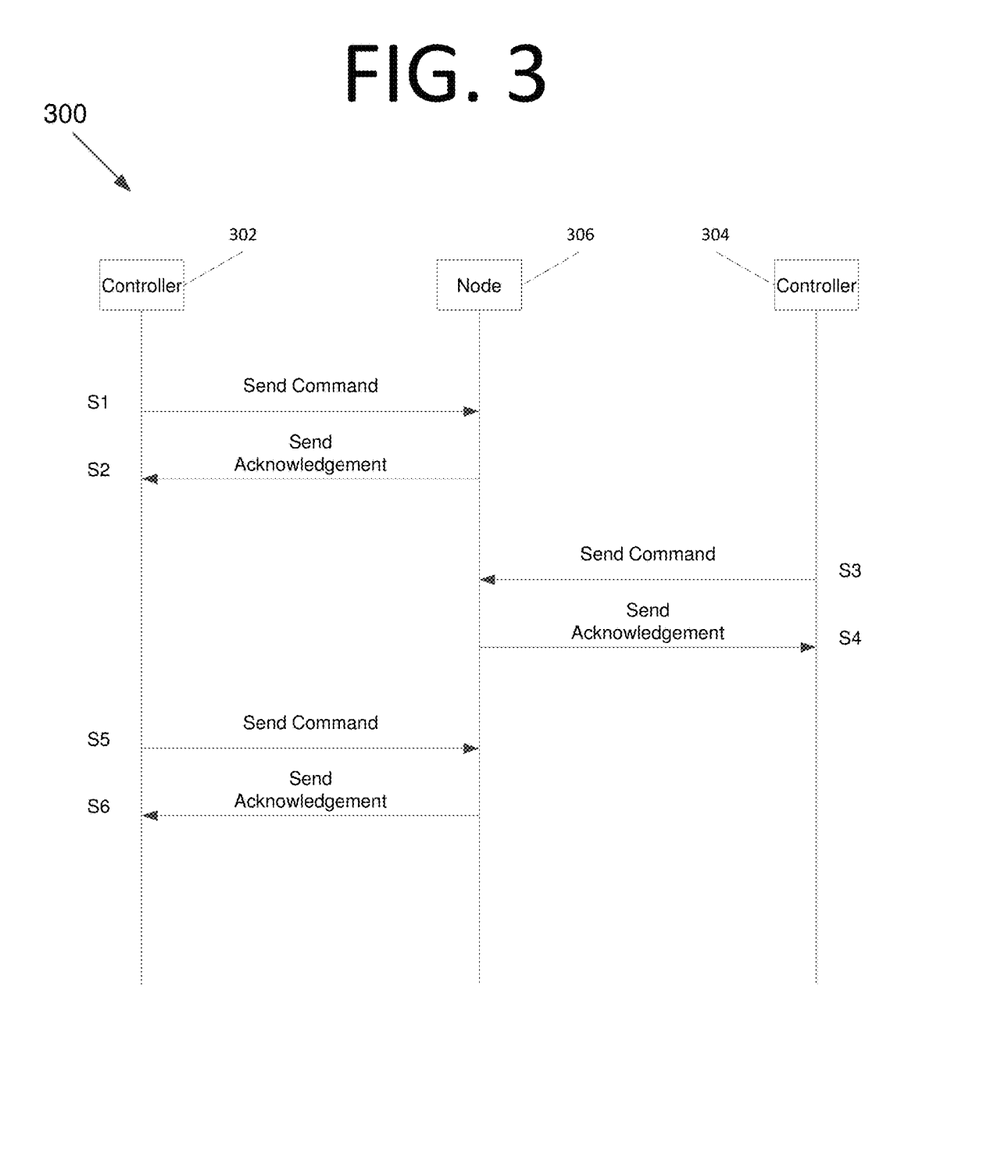
FIG. 3 is a schematic diagram illustrating a process for sending connectionless commands from more than one controller to at least one node, according to an embodiment of the present invention.

FIG. 3 is a schematic diagram illustrating a process 300 for sending connectionless commands from more than one controller to at least one node, according to an embodiment of the present invention. In some embodiments, a first controller 302 transmits a connectionless command S1 to a node 306, and in response to the connectionless command, node 306 transmits an acknowledgement message S2 to first controller 302.

Unlike conventional communications processes, where the first controller has to disconnect from the node prior to the second controller transmitting a command to the node, embodiments herein are not limited to such a constraint. For example, in some embodiments, second controller 304 transmits a connectionless command S3 to node 306 without waiting for first controller 302 to disconnect from node 306. In such embodiments, node 306 transmits an acknowledgement message S4 to second controller 304 in response to the connectionless command from second controller 304.

Because neither controller 302, 304 is required to connect to, and disconnect from, node 306, the embodiments herein may allow either controller 302, 304 to transmit a connectionless command to node 306 without waiting for the other controller to connect with, and then disconnect from, node 306. For example, first controller 302 transmits a connectionless command S5 to node 306, and node 306 transmits an acknowledgement receipt S6 back to first controller 302 regardless of any other connections.

Figure 4:
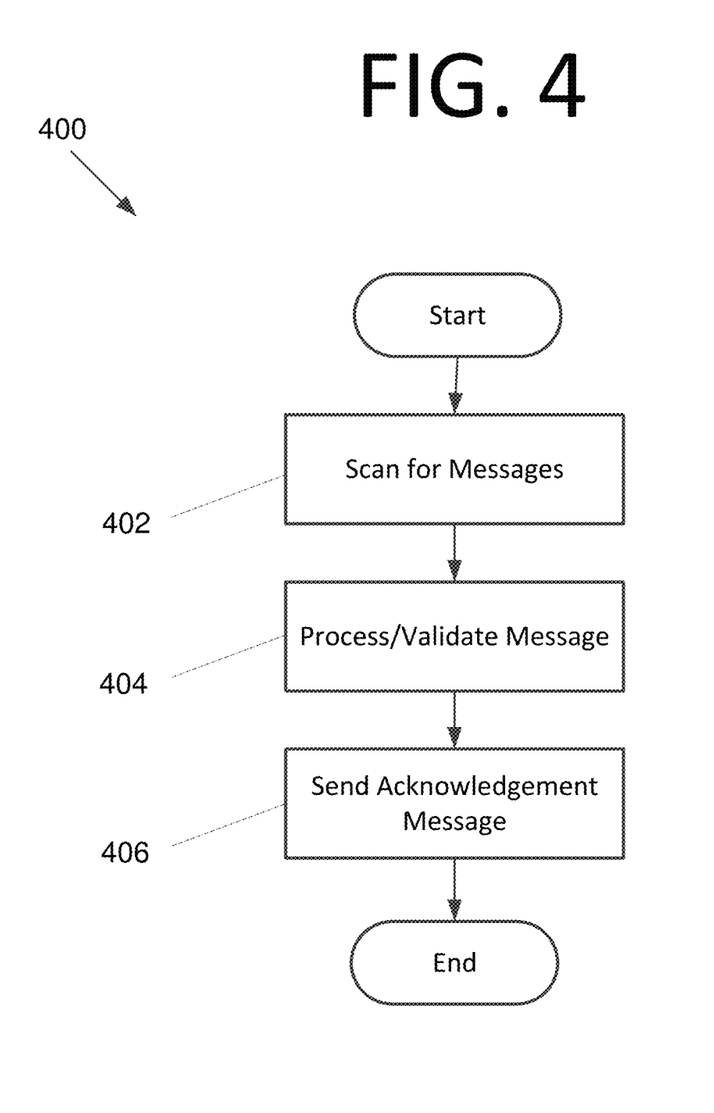
FIG. 4 is a flow diagram illustrating a process for receiving connectionless commands, according to an embodiment of the present invention.

FIG. 4 is a flow diagram illustrating a process 400 for receiving connectionless commands, according to an embodiment of the present invention. The process begins at 402 with one or more nodes scanning for messages. At 404, when the one or more nodes receive the message including the command, the one or more nodes process and validate the message, confirming that the correct node received the message. At 406, the one or more nodes send an acknowledgement message to the controller, informing the controller that the message has been received. By processing and validating the message, if another duplicate message is received by the one or more nodes, then the duplicate message can be ignored.

Figure 5:
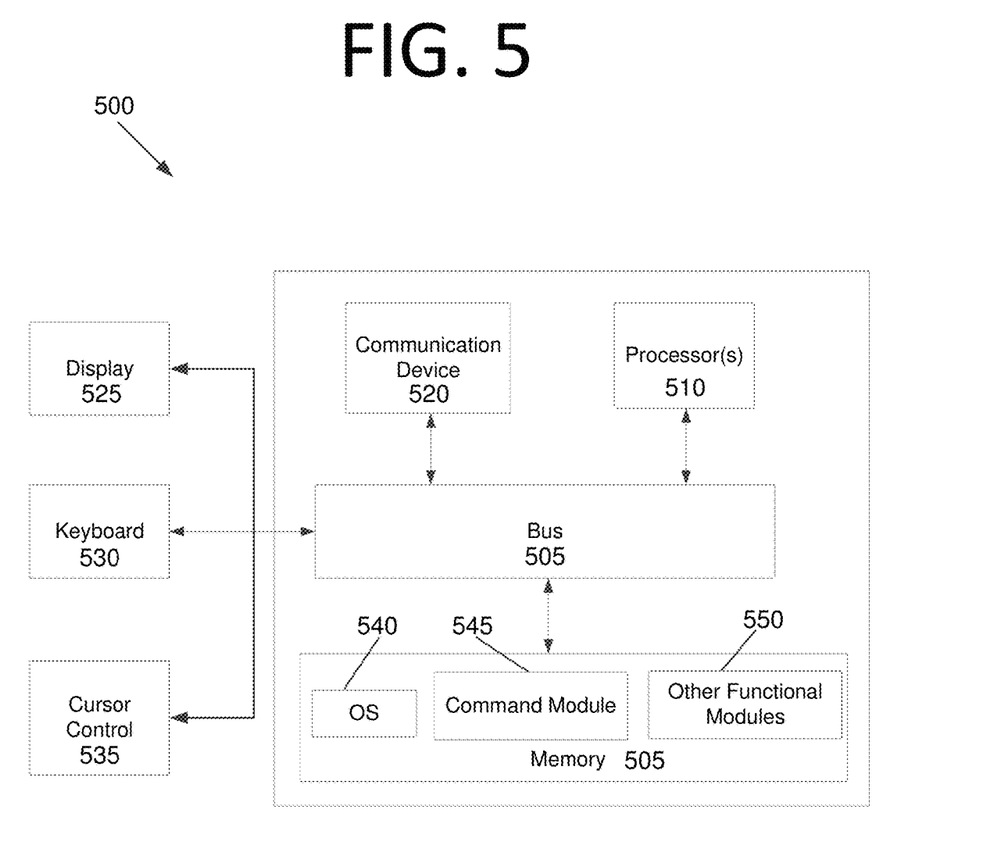
FIG. 5 is a block diagram illustrating a computing system configured to facilitate or participate in the sending of connectionless commands, according to an embodiment of the present invention.

FIG. 5 is a block diagram illustrating a computing system 500 configured to transmit connectionless commands, according to an embodiment of the present invention. For instance, computing system may be a controller, a mesh network device, a device not yet connected to the mesh network, a bridge, a server, or any other suitable computing system without deviating from the scope of the invention. IoT nodes may also include similar hardware to computing system 500 in some embodiments, but with software configured to receive, complete, and acknowledge commands. Computing system 500 includes a bus 505 or other communication mechanism for communicating information, and processor(s) 510 coupled to bus 505 for processing information. Processor(s) 510 may be any type of general or specific purpose processor, including a central processing unit (CPU), an application specific integrated circuit (ASIC), a microcontroller, or any other suitable processing hardware without deviating from the scope of the invention. Processor(s) 510 may also have multiple processing cores, and at least some of the cores may be configured to perform specific functions. Multi-parallel processing may be used in some embodiments. Computing system 500 further includes memory 515 for storing information and instructions to be executed by processor(s) 510. Memory 515 can be comprised of any combination of random access memory (RAM), read only memory (ROM), flash memory, cache, static storage such as a magnetic or optical disk, or any other types of non-transitory computer-readable media or combinations thereof. Additionally, computing system 500 includes a communication device 520, such as a transceiver and antenna, to wirelessly provide access to a communications network.

Non-transitory computer-readable media may be any available media that can be accessed by processor(s) 510 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 510 are further coupled via bus 505 to a display 525, such as a Liquid Crystal Display (LCD), for displaying information to a user. A keyboard 530 and/or a cursor control device 535, such as a computer mouse, are further coupled to bus 505 to enable a user to interface with computing system. However, in certain embodiments, such as those for mobile computing implementations, a physical keyboard and mouse may not be present, and the user may interact with the device solely through display 525 via a haptic interface and/or a touchpad (not shown), or through no interface at all (e.g., where a device only has an "on" button). As such, display 525, keyboard 530, and/or cursor control device 535 may not be present in some computing systems. Any type and combination of input devices may be used as a matter of design choice.

Memory 515 stores software modules that provide functionality when executed by processor(s) 510. The modules include an operating system 540 for computing system 500. The modules further include a command module 545 that is configured to perform any of the controller operations discussed herein without deviating from the scope of the invention. Computing system 500 may include one or more additional functional modules 550 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
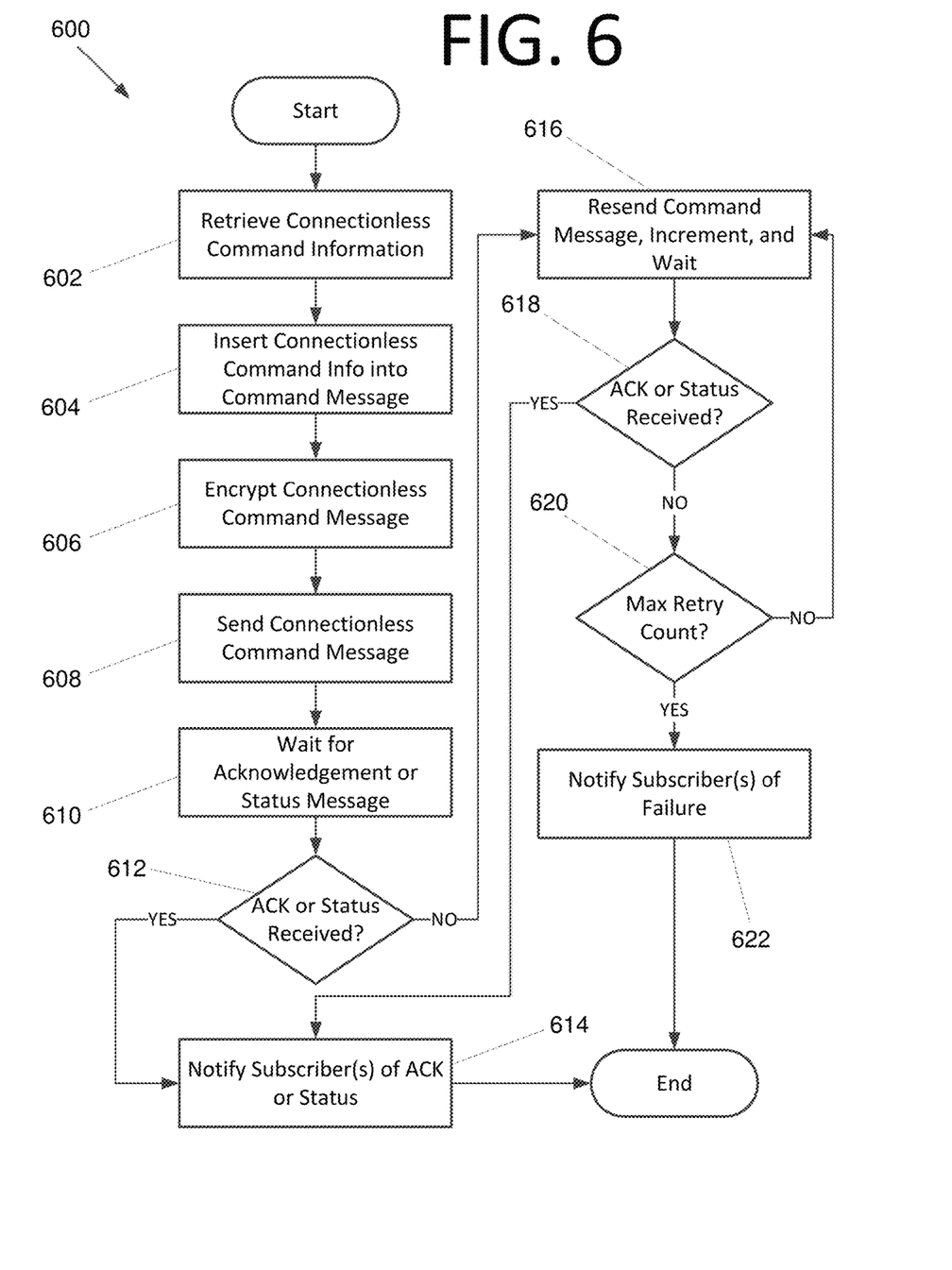
FIG. 6 is a flowchart illustrating a controller operation process for performing connectionless wireless communication between at least one controller and a plurality of nodes in a network, according to an embodiment of the present invention.

FIG. 6 is a flowchart 600 illustrating a controller operation process for performing connectionless wireless communication between at least one controller and a plurality of nodes in a network, according to an embodiment of the present invention. The process begins with a controller retrieving connectionless command information prior to sending the connectionless command at 602. The information may include a network ID, a node ID, and one or more keys in some embodiments. In certain embodiments, at least two of the plurality of nodes form a group of nodes identified by a unique group ID, and the connectionless command information includes the group ID. The controller and the plurality of nodes may be configured to communicate with one another using BLE protocol and the controller may operate in a peripheral mode when communicating with the plurality of nodes.

The controller inserts the connectionless command information (e.g., a network ID, a node or group ID, a source ID, a command, command parameters, a sequence ID, and a subsequence ID) into the connectionless command message at 604 and encrypts the connectionless command message at 606. In some embodiments, the connectionless command message can only be decrypted by a device key that is known to the node and a server, or by a network key that is known only to the server and the plurality of nodes in the network. In certain embodiments, the encrypted connectionless command message includes both a unique sequence ID and subsequence ID. In some embodiments, the connectionless command message controls two or more nodes.

The controller sends the connectionless command message at 608. The controller then switches to listening mode and waits for an acknowledgement or status message from a recipient node for a predefined period of time at 610. If an acknowledgement or status message is received within a predefined period of time at 612, one or more subscribers are notified of the acknowledgement or status message at 614.

However, if no acknowledgement or status message is received within the predefined period of time at 612, the controller resends the connectionless command message and increments a max retry value at 616. In some embodiments, a new sequence ID is inserted into the connectionless command message before resending. If the acknowledgement or status message is received within the predefined period of time at 618, one or more subscribers are notified of the acknowledgement or status message at 614. If the acknowledgement or status message is not received within the predefined period of time at 618, the controller checks whether the max retry count has been reached at 620. If not, the process returns to step 616 and the message is resent. If the max retry value has been met at 620, one or more subscribers are notified that the acknowledgement or status message has not been received at 622.

Figure 7:
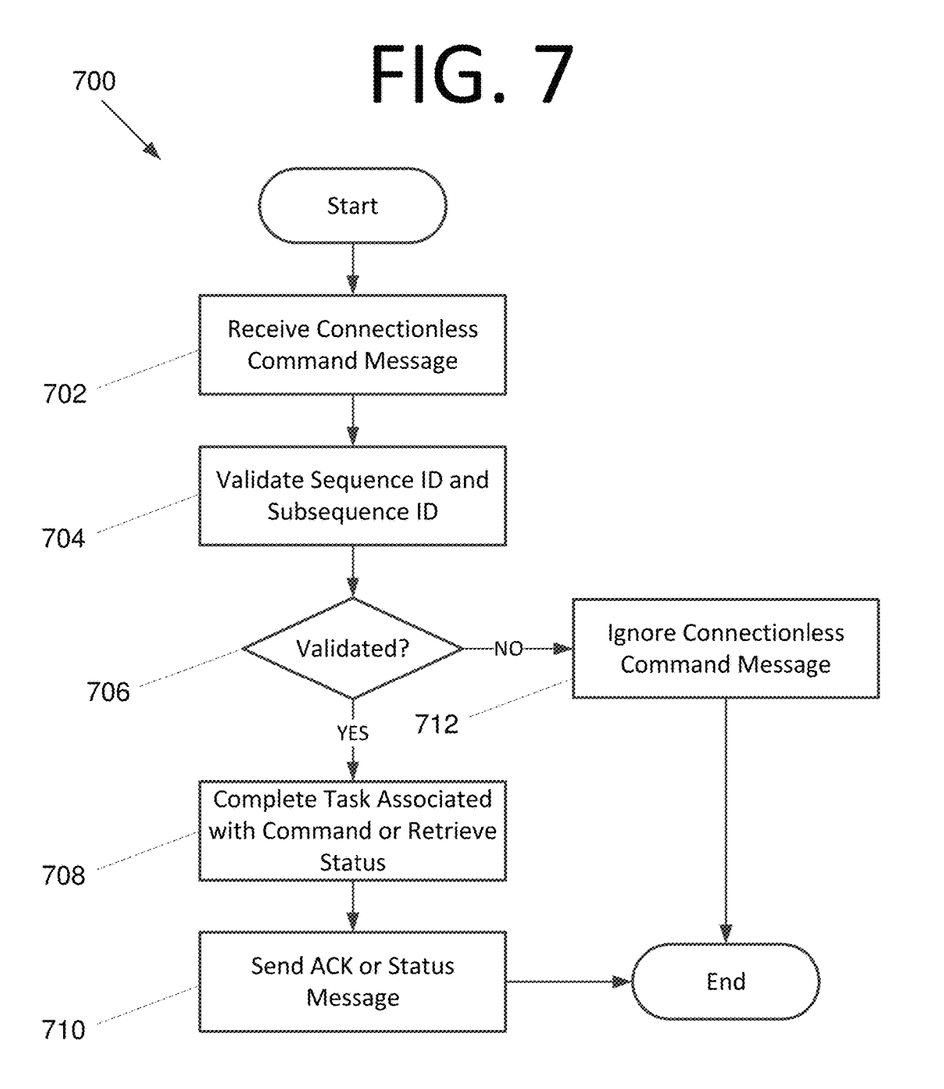
FIG. 7 is a flowchart illustrating a node operation process for performing connectionless wireless communication between at least one controller and a plurality of nodes in a network, according to an embodiment of the present invention.

FIG. 7 is a flowchart 700 illustrating a node operation process for performing connectionless wireless communication between at least one controller and a plurality of nodes in a network, according to an embodiment of the present invention. The process begins with a node receiving a connectionless command message from a controller at 702. The node then validates the current sequence ID and a subsequence ID at 704.

Validation of the current sequence ID and subsequence ID of the connectionless command message may include validating that they are greater than a previous sequence ID and a previous subsequence ID of a previous connectionless command message sent by the controller, for instance. However, validation is not limited to a "greater than" check. For instance, success and failure of validation may be determined based on an incremented, wrap-around sequence ID and subsequence ID. More specifically, the sequence ID and subsequence ID may be defined within a desired range of values (e.g., 1 to 128 or any other desired range) and incremented with each new sequence ID and subsequence ID. Once the highest value is reached, the next ID will "wrap around" back to the lowest value, and the values will again be incremented from there. However, any suitable validation mechanism may be used to validate the sequence ID and subsequence ID without deviating from the scope of the invention.

If the validation succeeds at 706, the node completes a task associated with the command or retrieves a status (e.g., an operational status of the node) at 708. An acknowledgement message is then sent to the controller after the task is completed or the status is retrieved at 710. However, if the validation fails at 706, the connectionless command message is ignored at 712.

The process steps performed in FIGS. 2-4, 6, and 7 may be performed by a computer program, encoding instructions for the nonlinear adaptive processor to perform at least the processes described in FIGS. 2-4, 6, and 7, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the nonlinear adaptive processor to implement the processes described in FIGS. 2-4, 6, and 7, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a controller; and
a network comprising a plurality of nodes;
wherein the controller is configured to:
    encrypt a data packet comprising a network ID identifying the network, a destination node ID identifying a destination node for the data packet, a source ID identifying the controller, a destination node command and command parameters, a sequence ID, and a subsequence ID;
    communicate the data packet in a connectionless message to a recipient node of the network that is not the destination node;
wherein the recipient node is configured to:
    receive the connectionless message;
    decrypt the data packet;
    compare the destination node ID from the data packet to an ID of the recipient node;
    perform a connectionless broadcast the command message on the network in response to the destination node ID from the data packet not matching the ID of the recipient node;
each node of the plurality of nodes is configured to:
    repeat the process above for the recipient node;
    in response to the destination node ID from the data packet matching the ID of the node:
        execute a task associated with the command and command parameters of the data packet; and
        broadcast on the network a connectionless acknowledgement message addressed to the controller after the task is completed.

2. The system of claim 1, wherein at least two of the plurality of nodes form a group of nodes identified by a unique group ID, and the data packet further comprises the unique group ID, and wherein each node of the group is configured to perform the following in response to the destination node ID from the data packet matching the group ID:
    execute the task associated with the command and command parameters of the data packet; and
    broadcast on the network the acknowledgement message addressed to the controller after the task is completed.

3. The system of claim 1, wherein the controller and the plurality of nodes are configured to communicate with one another using BLE protocol and the controller operates in a peripheral mode when communicating with the plurality of nodes.

4. The system of claim 1, wherein the data packet can only be decrypted by a key available to a server and the plurality of nodes in the network.

5. The system of claim 1, wherein when a validation of the sequence ID and the subsequence ID by the destination node fails, the destination node is further configured to ignore the connectionless command message.

6. The system of claim 1, wherein after sending the connectionless command message, the controller is configured to switch to a listening mode and wait for the acknowledgement or status message from the recipient node.

7. The system of claim 6, wherein the controller is configured to wait for the acknowledgement or status message for a predefined period of time.

8. The system of claim 7, wherein the controller is configured to:
   resend the connectionless command message and increment a max retry value a predefined number of times when the acknowledgement or status message is not received within the predefined period of time; and
   when the max retry value has been met and no acknowledgement or status message has been received after the predefined period of time, notify a subscriber that the acknowledgement or status message has not been received.

9. The system of claim 8, wherein the resending of the connectionless command message further comprises inserting a new sequence ID into the connectionless command message, by the controller.

* * * * *